(12) United States Patent
MacKenzie

(10) Patent No.: US 10,517,229 B2
(45) Date of Patent: *Dec. 31, 2019

(54) WALL PLANTING SYSTEM

(71) Applicant: Hortech, Inc., Nunica, MI (US)

(72) Inventor: David S. MacKenzie, Nunica, MI (US)

(73) Assignee: Hortech, Inc., Nunica, MI (US)

(*) Notice: Subject to any disclaimer, the term of this patent is extended or adjusted under 35 U.S.C. 154(b) by 311 days.

This patent is subject to a terminal disclaimer.

(21) Appl. No.: 14/990,422

(22) Filed: Jan. 7, 2016

(65) Prior Publication Data

US 2016/0113211 A1  Apr. 28, 2016

Related U.S. Application Data

(63) Continuation of application No. 13/626,390, filed on Sep. 25, 2012, now Pat. No. 9,351,448.

(51) Int. Cl.
*A01G 9/02* (2018.01)

(52) U.S. Cl.
CPC ............ *A01G 9/025* (2013.01); *Y02P 60/244* (2015.11)

(58) Field of Classification Search
CPC ........... A01G 9/02; A01G 9/025; A01G 27/00
USPC ....... 47/79, 82, 83, 85, 86, 87, 46, 47, 66.6, 47/66.5, 65.5, 65.9, 66.1
See application file for complete search history.

(56) References Cited

U.S. PATENT DOCUMENTS

| 2,279,735 | A | | 4/1942 | Gates |
| 2,513,711 | A | | 7/1950 | Cain |
| 2,514,536 | A | | 7/1950 | Burney |
| 4,123,873 | A | | 11/1978 | Canova |
| 4,161,085 | A | | 7/1979 | Moffett, Jr. |
| 4,212,445 | A | * | 7/1980 | Hagen ..................... F16B 12/34 248/222.52 |

(Continued)

FOREIGN PATENT DOCUMENTS

| EP | 2335473 | 6/2011 |
| FR | 2857396 | 7/2003 |

(Continued)

OTHER PUBLICATIONS

International Search Report, dated Aug. 17, 2011, Korean Intellectual Property Office.
European Seach Report, dated Jan. 9, 2014.

*Primary Examiner* — Tien Q Dinh
*Assistant Examiner* — Ebony E Evans
(74) *Attorney, Agent, or Firm* — Price Heneveld LLP

(57) ABSTRACT

A wall mounted agricultural system includes a mounting structure including first and a second ends and supported from a substantially vertically extending wall surface, and at least one planter box that includes a plurality of sidewalls and a bottom wall that cooperate to form a compartment and an upwardly opening aperture, wherein at least one of the sidewalls comprises a rear wall facing the wall surface, the at least one planter box is configured to mount to the mounting structure such that the rear wall is spaced from the wall surface to create a space therebetween, and wherein the at least one planter box includes an aperture in fluid communication with the compartment and the space positioned between the rear wall and the wall surface, and wherein the aperture in fluid communication with the space is configured to allow water received through the upwardly opening aperture to drain into the space.

20 Claims, 5 Drawing Sheets

(56) References Cited

U.S. PATENT DOCUMENTS

| | | |
|---|---|---|
| 4,228,906 A | 10/1980 | Jones |
| 4,255,896 A | 3/1981 | Carl |
| 4,295,296 A * | 10/1981 | Kinghorn ............... A01G 9/025 47/82 |
| 4,334,386 A | 6/1982 | Burcombe et al. |
| 4,347,687 A | 9/1982 | Sibbel |
| 4,593,490 A | 6/1986 | Bodine |
| 4,920,695 A | 5/1990 | Garden |
| 5,095,649 A | 3/1992 | Brownlee |
| 5,265,376 A | 11/1993 | Less |
| 5,373,662 A | 12/1994 | Wickstrom |
| 5,647,695 A | 7/1997 | Hilfiker et al. |
| 5,669,185 A | 9/1997 | Proulx |
| 6,408,570 B1 | 6/2002 | Shih et al. |
| 6,615,542 B2 | 9/2003 | Ware |
| 7,171,782 B2 | 2/2007 | Felknor et al. |
| 7,536,829 B2 | 5/2009 | Genma et al. |
| 7,627,983 B1 | 12/2009 | Deutsch-Aboulmahassine |
| 2008/0003445 A1 | 1/2008 | Okuda et al. |
| 2008/0110086 A1 | 5/2008 | Julia |
| 2009/0260282 A1 | 10/2009 | Hashimoto et al. |
| 2009/0300984 A1 | 12/2009 | Gordon |
| 2010/0037517 A1 | 2/2010 | Copping et al. |
| 2010/0095586 A1 | 4/2010 | Sichello |
| 2011/0016784 A1 | 1/2011 | Taber |
| 2011/0113685 A1 | 5/2011 | Chang |
| 2011/0192081 A1* | 8/2011 | MacKenzie ............ A01G 9/025 47/66.6 |
| 2011/0192084 A1 | 8/2011 | MacKenzie |
| 2011/0258925 A1* | 10/2011 | Baker .................... A01G 9/023 47/65.8 |
| 2012/0186148 A1 | 7/2012 | Chang |
| 2013/0118070 A1* | 5/2013 | Marquez ................. A01G 9/02 47/66.6 |
| 2016/0037733 A1* | 2/2016 | Baker .................... A01G 9/025 47/82 |
| 2016/0192604 A1* | 7/2016 | Prescott ................. A01G 9/025 |

FOREIGN PATENT DOCUMENTS

| | | |
|---|---|---|
| GB | 2222063 | 2/1990 |
| GB | 2475101 | 5/2011 |
| JP | 2004248533 | 9/2004 |
| JP | 2005160381 | 6/2005 |
| JP | 2008029322 | 2/2008 |
| JP | 2011083200 | 4/2011 |

* cited by examiner

WALL PLANTING SYSTEM

BACKGROUND OF THE INVENTION

The present invention relates to a planting system, and in particular to a modular wall planting system that is adapted to secure to a vertical surface of a wall or a building structure.

SUMMARY OF THE INVENTION

One aspect of the present invention is to provide a modular wall mounted agricultural system comprising a mounting structure comprising a first member including a first end and a second end, wherein the mounting structure is supported from a substantially vertically extending wall surface, and at least one planter box that includes a plurality of sidewalls and a bottom wall that cooperate to form a compartment configured to receive plant matter therein and an upwardly opening aperture configured to receive a fluid therethrough, wherein at least one of the sidewalls comprises a rear wall facing the wall surface, the at least one planter box is configured to mount to the mounting structure such that the rear wall is spaced from the wall surface to create a space therebetween, and wherein the at least one planter box includes an aperture in fluid communication with the compartment and the space positioned between the rear wall and the wall surface and wherein the aperture in fluid communication with the space is configured to allow water to receive through the upwardly opening aperture to drain from the planter box into the space.

Another aspect of the present invention is to provide a method for installing modular wall mounting agricultural system comprising providing a mounting structure comprising a first member including a first end and a second end, supporting the mounting structure from a substantially vertically extending wall surface, and providing at least one planter box that includes a plurality of sidewalls and a bottom wall that cooperate to form a compartment configured to receive plant matter therein and an upwardly opening first aperture to receive a fluid therethrough, wherein at least one of the sidewalls comprises a rear wall facing the wall surface, and wherein the at least one planter box includes a second aperture, mounting the at least one planter box to the mounting structure such that the rear wall is spaced from the substantially vertically extending wall surface to create a space therebetween, the second aperture of the at least one planter box is in fluid communication with the compartment and the space positioned between the rear wall and the substantially vertically extending wall surface, and water receive through the first aperture drains from the compartment through the second aperture and into the space.

These and other features, advantages, and objects of the present invention will be further understood and appreciated by those skilled in the art by reference to the following specification, claims, and appended drawings.

DETAILED DESCRIPTION

Figure 1:
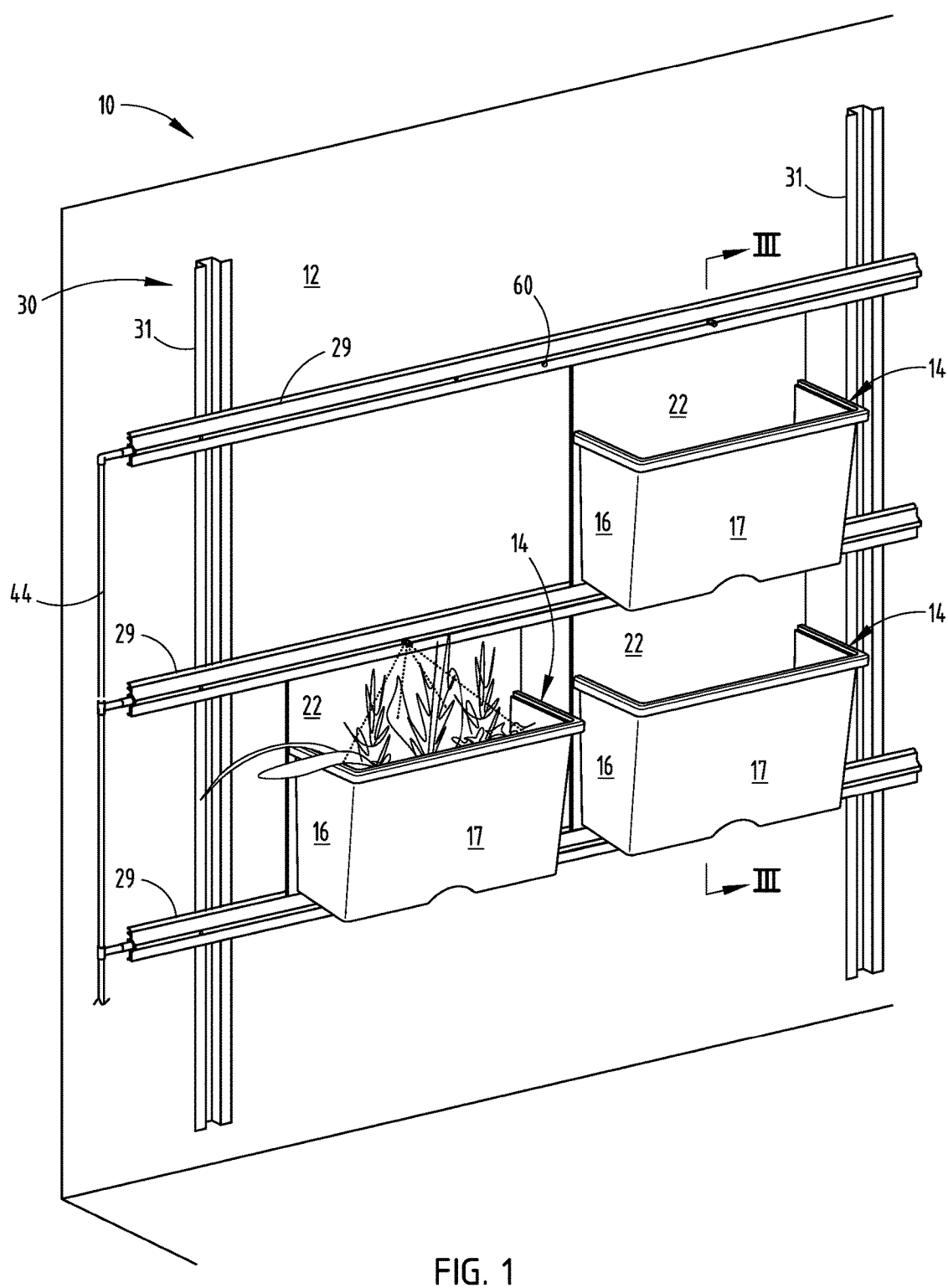
FIG. 1 is a perspective view of a vertical surface employing the modular wall mounted agricultural system embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a modular wall mounted agricultural system embodying the present invention. In the illustrated example, the modular wall mounted agricultural system 10 is employed on, and secured to, a vertical wall surface 12 of a building structure, although the wall mounted agricultural system 10 may be utilized in conjunction with both interior and exterior vertical and substantially vertical wall surfaces. The wall mounted agricultural system 10 comprises at least one planter box 14, but more likely a plurality of planter boxes 14, which cooperate to completely cover the vertical wall surface 12.

Figure 2:
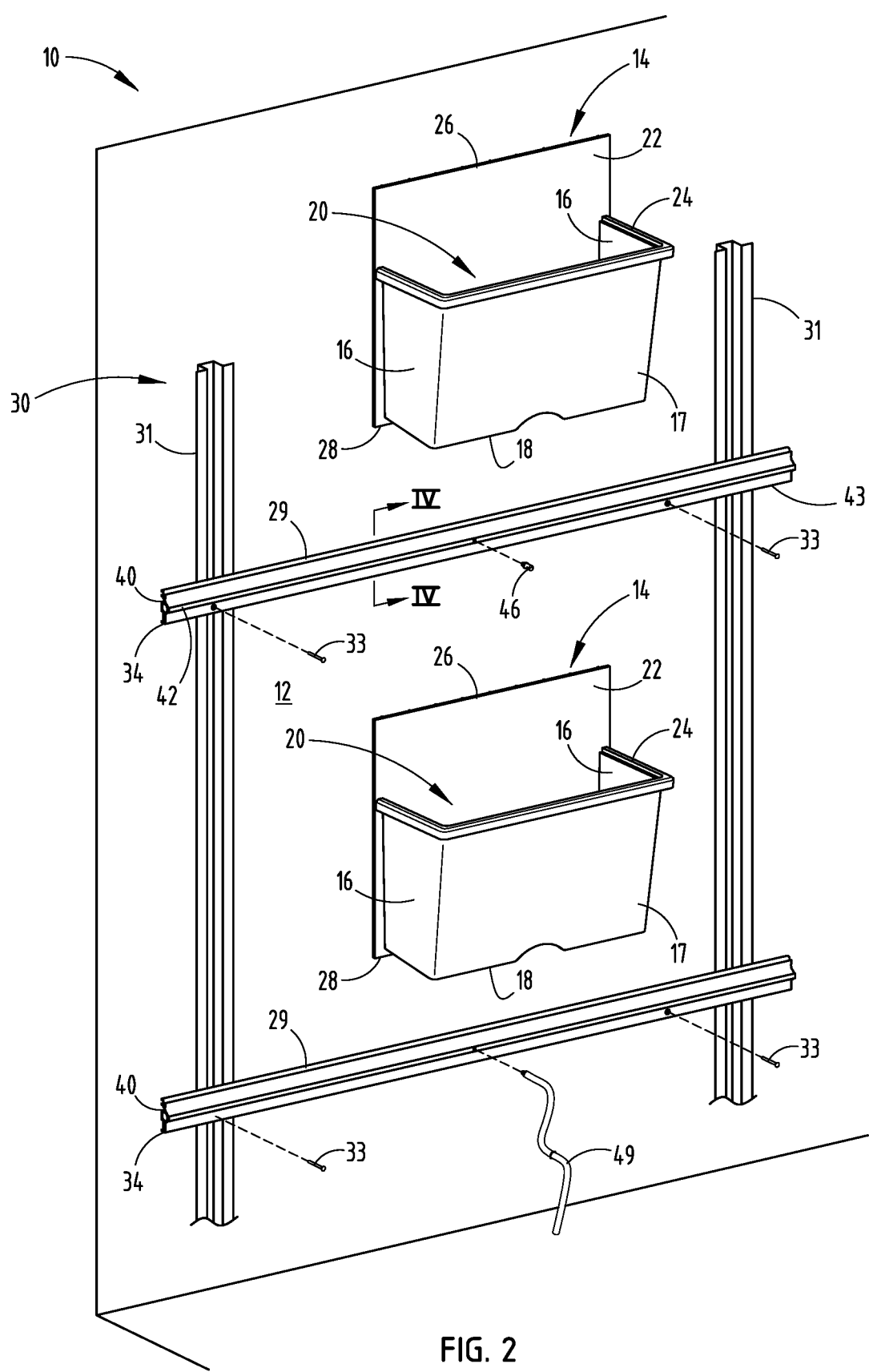
FIG. 2 is an exploded perspective view of the modular wall mounted agricultural system.
Figure 3:
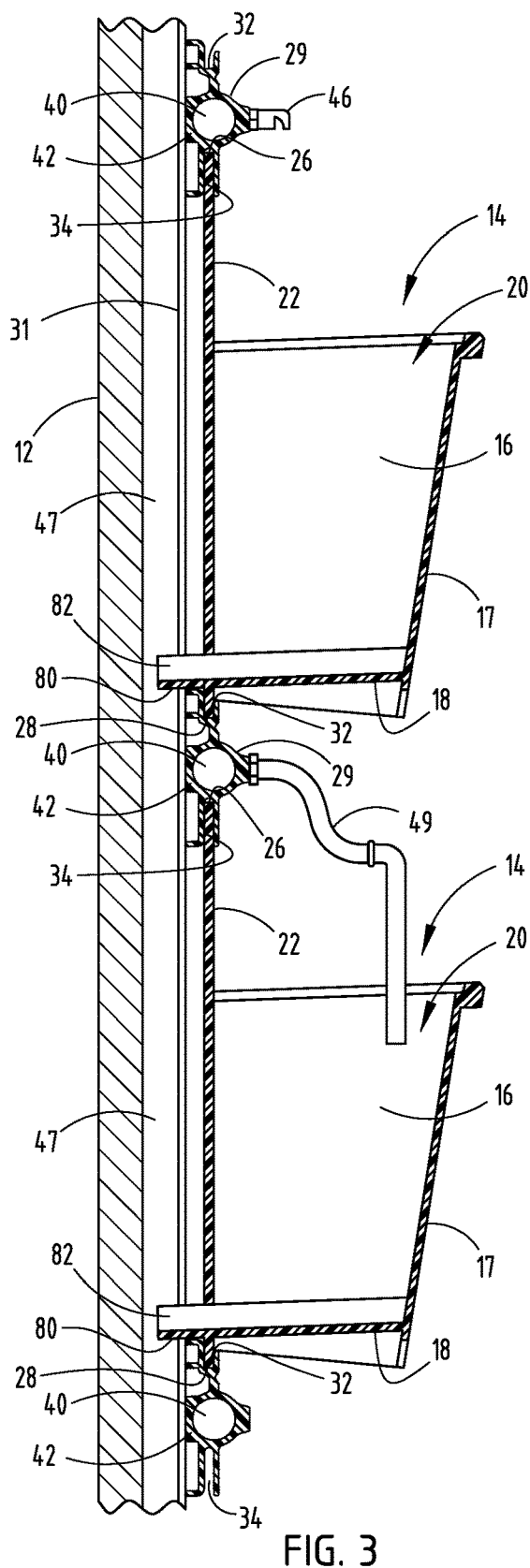
FIG. 3 is a cross-sectional side view of the modular wall mounted agricultural system, taken along the line III-III, FIG. 1.
Figure 4:
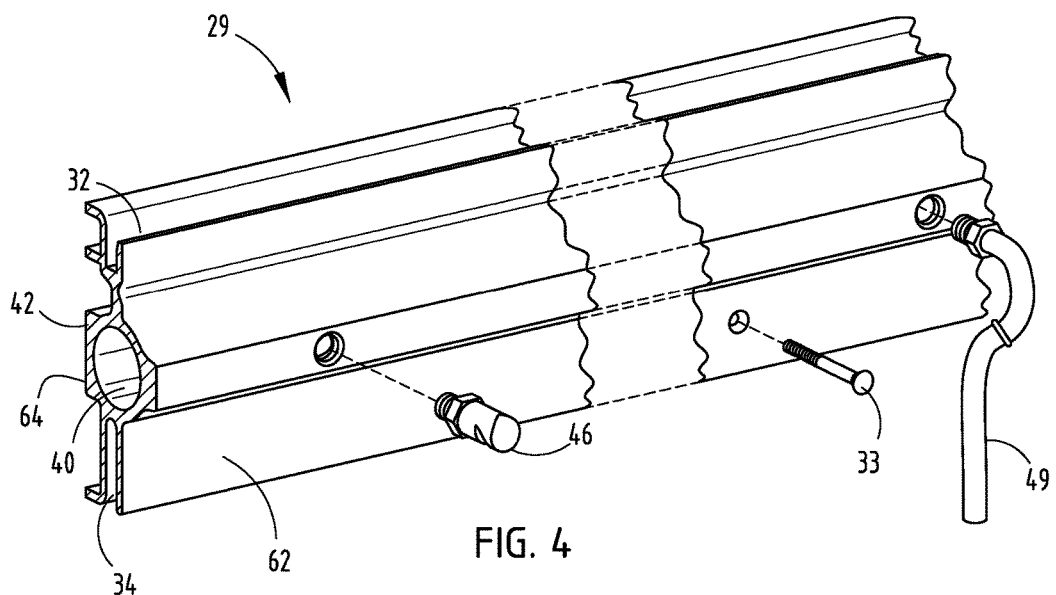
FIG. 4 is an exploded perspective view of a mounting member of the modular wall mounted agricultural system.
Figure 5:
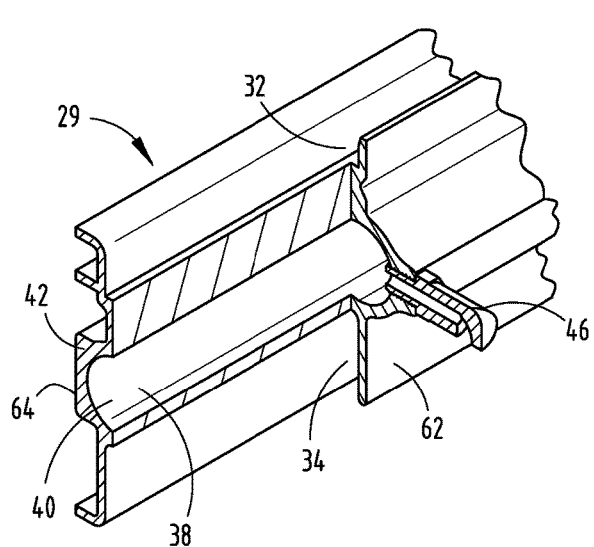
FIG. 5 is a cross-sectional perspective view of the mounting member.
Figure 6:
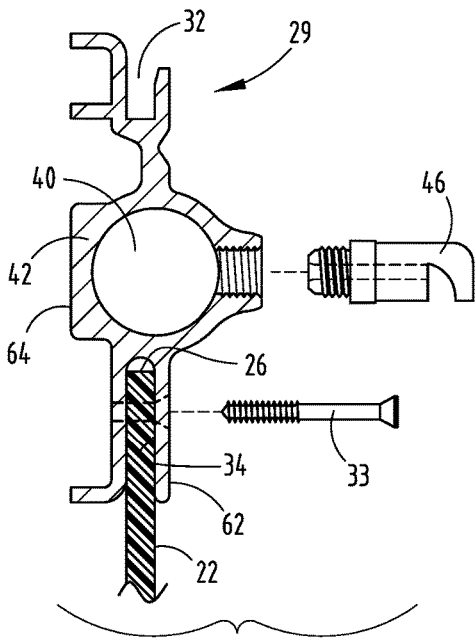
FIG. 6 is a cross-sectional side view of the mounting member.

As best illustrated in FIGS. 2 and 3, each planter box 14 includes a plurality of sidewalls including a pair of sidewalls 16, a front wall 17, and a rear wall 22, and include a bottom wall 18 that cooperate to form an interior compartment 20. The interior compartment 20 is configured to receive plant matter therein, such as plantings and aggregate, e.g., dirt, soil, sand, and the like.

Each planter box 14 includes a rear wall 22 that facilitates enclosing the interior compartment 20 and extends upwardly to a point above a top edge 24 of each sidewall 16 and also extends in a substantially downward direction to a point below the bottom wall 18. The wall mounted agricultural system 10 includes a mounting structure 30 that includes a plurality of horizontally extending mounting members 29 and a plurality of vertically extending frame members 31 that are adapted to support the planter boxes 14 from the wall surface 12. Each mounting member 29 is formed to have a substantially H-shaped cross-section along the entire length of the mounting structure 30. The H-shape of each mounting member 29 forms an upper channel 32 and a lower channel 34 that each extend along the longitudinal direction of the mounting member 29. The upper channel 32 is sized to receive a lower edge 28 of the rear wall 22 of the planter box 14. The lower channel 34 is sized to receive a top edge 26 of the rear wall 22 of the planter box 14. Therefore, two mounting members 29 are typically employed to secure each planter box 14. Each vertical frame member 31 is provided a hat-shaped cross-sectional configuration. A plurality of mechanical fasteners such as screws 33 extend through the mounting members 29 and frame member 31 to secure each to the wall surface 12.

As seen in FIGS. 2-6, each mounting member 29 includes a first end 42, a second end 43, and a conduit 38 that extends along the longitudinal direction of the mounting member 29. In the illustrated example, an input aperture 40 is located at the first end 42 of the mounting member 29. Additionally, an output aperture may be included at the second end 43. The input aperture 40 is sized and adapted so as to telescopingly mate with an input water line 44. Tapped into the conduit 38 is a water spraying device, such as a nozzle 46. The nozzle 46 is adapted to spray or mist water from the waterway 38 onto the plant matter residing in the planter box 14 immediately below the mounting member 29. Alternatively, the nozzles 46 are replaced with drip assemblies 49 (FIGS. 3 and 4) tapped into the conduit 38 and extending into the plant matter located with the interior compartment 20. While nozzles 46 and drip assemblies 49 are described herein, other devices suitable for delivering fluid from the conduit 38 to the interior compartment may also be utilized. In assembly, the plurality of mounting members 29 and the vertical frame members 31 are secured to the wall surface 12 via the plurality of screws 29 such that the rear wall 22 of each planter 14 is spaced from the wall surface 22 defining a space 47 therebetween. It is noted that the space 47 is concealed from view to an observer positioned in front of the system 10. The mounting members 29 are secured to the wall surface 12 in a vertically aligned manner and sufficiently spaced to accommodate planter boxes 14 therebetween. As described previously, the top edge 26 of each planter box 14 securely engages into the bottom channel 34 of a mounting member 29 and the bottom edge 28 of the planter box 14 rear wall 22 securely engages the top channel 32 of a mounting member 29. The input water line 44 brings water from a source and is passed through the input aperture 40 of each mounting member 29. This allows water to be distributed to the plant matter within the planter boxes 14 as needed, via the nozzle 46.

Figure 7:
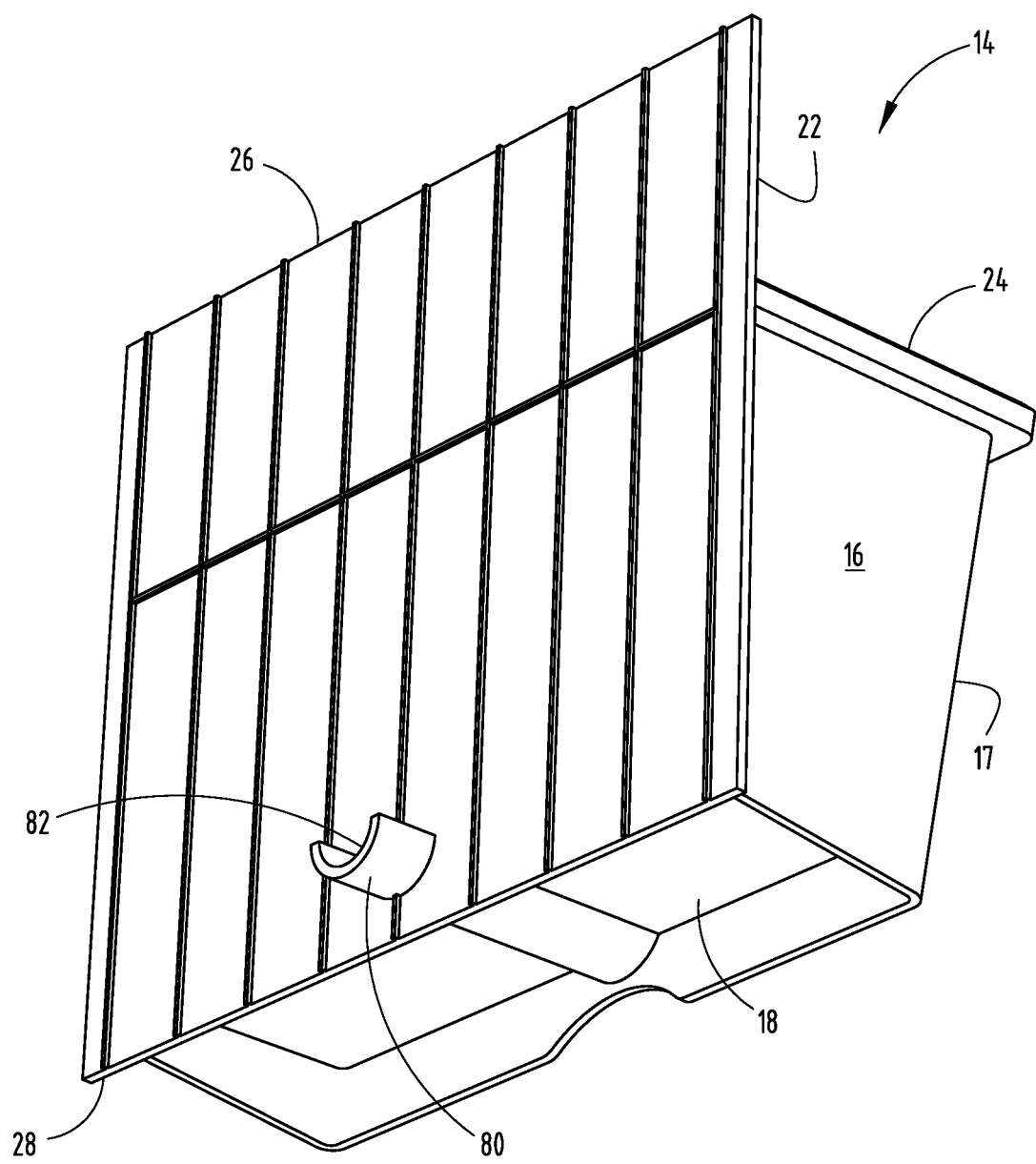
FIG. 7 is a rear perspective view of a planter box.

As best illustrated in FIGS. 3 and 7, each planter box 14 further includes an integral trough 80 located within the bottom wall 18 and extending through the rear wall 22 defining an aperture 82 therethrough that provides fluid communication between the interior compartment 20 and the space 47 defined between the rear wall 22 and the wall surface 12. In the illustrated example, the trough 80 includes a semi-circular cross-sectional configuration.

In operation, fluid received within the compartment 20 of the planter box 14 exits the compartment 20 via the trough 80 and aperture 82. This fluid drains into the space 47. The rear walls 22 of vertically aligned planter boxes 14 cooperate to conceal adjacent spaces 47, such that the fluid may travel vertically behind the plurality of planter boxes 47 without being seen.

The present inventive modular wall mounted agricultural system allows plant matter to be secured to vertical and substantially vertical surfaces of wall structures of free standing walls and buildings, thereby increasing the aesthetic appearance of the structure as well as improving the thermal efficiency of associated buildings. Further, the wall mounted agricultural system provides a durable outer surface to the structure to which it is attached, and includes a relatively uncomplicated design that may be installed and maintained by relatively unskilled personal. The present inventive planting system is efficient to use, capable of a long operating life, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A modular wall mounted agricultural system, comprising:
  a mounting structure comprising a first member including a first end and a second end, wherein the mounting structure is supported from a substantially vertically extending wall surface; and
  at least two planter boxes including a first planter box and a second planter box spaced vertically below the first planter box, where each of the planter boxes includes a plurality of sidewalls and a bottom wall that cooperate to form a compartment configured to receive plant matter therein and an upwardly opening aperture configured to receive a fluid therethrough, wherein at least one of the sidewalls of each of the planter boxes comprises a rear wall facing the wall surface, each of the planter boxes configured to mount to the mounting structure such that the rear wall is spaced from the wall surface to create a space therebetween and such that the rear walls of the two planter boxes are substantially co-planar with one another, and wherein each of the planter boxes includes an aperture in fluid communication with the compartment and the space positioned between the rear wall and the wall surface, wherein the aperture is in fluid communication with the space such that water received through the upwardly opening aperture of the first planter box drains from the first planter box into the space such that water received into the space from the first planter box may pass vertically by the second planter box without entering the compartment of the second planter box.

2. The modular wall mounted agricultural system of claim 1, wherein the at least two planter boxes each further includes a fluid conduit extending from the aperture in fluid communication with the space.

3. The modular wall mounted agricultural system of claim 2, wherein the conduit of each of two planter boxes is integral with the respective planter box.

4. The modular wall mounted agricultural system of claim 2, wherein the conduit comprises a semi-circular, cross-sectional configuration.

5. The modular wall mounted agricultural system of claim 1, wherein the aperture in fluid communication with the space is at least partially located within the rear wall.

6. The modular wall mounted agricultural system of claim 1, wherein the first member of the mounting structure comprises a fluid conduit extending longitudinally between the first and the second end, and wherein the at least two planter boxes each receive fluid through the upwardly opening aperture via the fluid conduit.

7. The modular wall mounted agricultural system of claim 1, wherein the mounting structure further comprises a second member positioned between the first member and the wall surface, wherein the second member is attached to the wall surface and the first member is attached to the second member, thereby supporting the first mounting structure from the wall surface.

8. The modular wall mounted agricultural system of claim 7, wherein the first member extends substantially horizontally with respect to the wall surface, and wherein the second member extends substantially vertically with respect to the wall surface.

9. The modular wall mounted agricultural system of claim 1, wherein the first member includes at least one longitudinally extending channel, and wherein the at least one planter box is supported within the at least one channel.

10. The modular wall mounted agricultural system of claim 9, wherein the at least one longitudinally extending channel includes a pair of longitudinally extending channels.

11. A method for installing a modular wall mounted agricultural system, comprising:
providing a mounting structure comprising a first member including a first end and a second end;
supporting the mounting structure from a substantially vertically extending wall surface; and
providing at least two planter boxes including a first planter box and a second planter box spaced vertically below the first planter box, where each of the planter boxes includes a plurality of sidewalls and a bottom wall that cooperate to form a compartment configured to receive plant matter therein and an upwardly opening first aperture configured to receive a fluid therethrough, wherein at least one of the sidewalls of each of the planter boxes comprises a rear wall facing the wall surface, and wherein each of the at least two planter boxes includes a second aperture; and
mounting each of the at least two planter boxes to the mounting structure such that the rear wall is spaced from the substantially vertically extending wall surface to create a space therebetween and such that the rear walls of the two planter boxes are substantially co-planar with one another, the second aperture of each of the at least two planter boxes is in fluid communication with the compartment and the space positioned between the rear wall and the substantially vertically extending wall surface, and water received through the first aperture drains from the compartment through the second aperture and into the space such that water received into the space from the first planter box passes vertically by the second planter box without entering the compartment of the second planter box.

12. The method of claim 11, wherein the at least two planter boxes each further includes a fluid conduit extending from the aperture in fluid communication with the space.

13. The method of claim 12, wherein the conduit of each of the two planter boxes is integral with the respective planter box.

14. The method of claim 12, wherein the conduit comprises a semi-circular, cross-sectional configuration.

15. The method of claim 11, wherein the aperture in fluid communication with the space is at least partially located within the rear wall.

16. The method of claim 11, wherein the first member of the mounting structure comprises a fluid conduit extending longitudinally between the first and the second end, and wherein the at least two planter boxes each receive fluid through the upwardly opening aperture via the fluid conduit.

17. The method of claim 11, wherein the mounting structure further comprises a second member positioned between the first member and the wall surface, wherein the second member is attached to the wall surface and the first member is attached to the second member, thereby supporting the first mounting structure.

18. The method of claim 17, wherein the first member extends substantially horizontally with respect to the wall surface, and wherein the second member extends substantially vertically with respect to the wall surface.

19. The method of claim 11, wherein the first member includes at least one longitudinally extending channel, and wherein the at least two planter boxes are each supported within the at least one channel.

20. The method of claim 19, wherein the at least one longitudinally extending channel includes a pair of longitudinally extending channels.

* * * * *

UNITED STATES PATENT AND TRADEMARK OFFICE
CERTIFICATE OF CORRECTION

PATENT NO. : 10,517,229 B2  
APPLICATION NO. : 14/990422  
DATED : December 31, 2019  
INVENTOR(S) : David S. MacKenzie Page 1 of 1

It is certified that error appears in the above-identified patent and that said Letters Patent is hereby corrected as shown below:

On the Title Page

Item (57)
Abstract, Line 2, delete "a".

In the Specification

Column 1
Line 30, "to receive" should be --received--.
Line 33, after "installing" insert --a--.
Line 51, "receive" should be --received--.

Column 3
Line 15, "with" should be --within--.
Line 21, "29" should be --33--.
Line 31, "14 rear" should be --14. Rear--.
Line 61, "personal" should be --personnel--.

In the Claims

Column 4
Claim 1, Line 13, "where" should be --wherein--.
Claim 3, Line 40, after "of" (second occurrence) insert --the--.

Column 5
Claim 11, Line 11, delete "and".
Claim 11, Line 14, "where" should be --wherein--.

Column 6
Claim 16, Line 17, "receive" should be --receives--.

Signed and Sealed this  
Eighteenth Day of August, 2020

Andrei Iancu  
*Director of the United States Patent and Trademark Office*